(12) United States Patent
Liu et al.

(10) Patent No.: US 8,462,094 B2
(45) Date of Patent: Jun. 11, 2013

(54) DISPLAY PANEL INCLUDING A CASCADE DRIVER AND OPTO-ELECTRONIC APPARATUS THEREOF

(75) Inventors: Po-Yuan Liu, Hsin-Chu (TW);
Sheng-Kai Hsu, Hsin-Chu (TW);
Ming-Sheng Lai, Hsin-Chu (TW)

(73) Assignee: Au Optronics Corp., Hsin-Chu (TW)

( * ) Notice: Subject to any disclaimer, the term of this patent is extended or adjusted under 35 U.S.C. 154(b) by 798 days.

(21) Appl. No.: 11/907,310

(22) Filed: Oct. 11, 2007

(65) Prior Publication Data

US 2008/0259068 A1    Oct. 23, 2008

(30) Foreign Application Priority Data

Apr. 18, 2007 (TW) ................................ 96113706 A

(51) Int. Cl.
*G09G 3/36* (2006.01)
(52) U.S. Cl.
USPC .......................................... 345/100; 349/149
(58) Field of Classification Search
USPC ...................... 345/87–103, 210–212; 349/149
See application file for complete search history.

(56) References Cited

U.S. PATENT DOCUMENTS

| | | | |
|---|---|---|---|
| 6,229,510 B1 | 5/2001 | Kim et al. | |
| 6,392,626 B1 | 5/2002 | Moon | |
| 2002/0024484 A1* | 2/2002 | Lee et al. | 345/87 |
| 2005/0052396 A1* | 3/2005 | Kim | 345/99 |
| 2005/0156840 A1* | 7/2005 | Kim et al. | 345/87 |
| 2005/0212735 A1* | 9/2005 | Lin | 345/87 |
| 2006/0001822 A1* | 1/2006 | Sano | 349/150 |
| 2007/0024560 A1* | 2/2007 | Kim et al. | 345/94 |
| 2007/0057977 A1* | 3/2007 | Shih et al. | 347/2 |
| 2007/0146231 A1* | 6/2007 | Hamahashi et al. | 345/1.2 |
| 2008/0174583 A1* | 7/2008 | Lee et al. | 345/211 |

FOREIGN PATENT DOCUMENTS

| | | |
|---|---|---|
| CN | 1619367 A | 5/2005 |
| CN | 1844978 A | 10/2006 |
| CN | 1991450 A | 7/2007 |
| TW | 200634375 | 10/2006 |

OTHER PUBLICATIONS

Office Action dated Aug. 16, 2011 issued in corresponding Taiwanese application No. 096113706.

* cited by examiner

*Primary Examiner* — Chanh Nguyen
*Assistant Examiner* — Sanghyuk Park
(74) *Attorney, Agent, or Firm* — Bacon & Thomas, PLLC

(57) ABSTRACT

A display panel including a liquid crystal layer, several driving circuits, several flexible circuit films and at least one printed circuit board is provided. The liquid crystal layer is disposed between a first substrate and a second substrate, wherein the first substrate has a display area and at least one peripheral area adjacent to the display area, the second substrate has at least one common electrode. The driving circuits are disposed on the peripheral area in series. The flexible circuit films are electrically connected to the driving circuits. The printed circuit board is electrically connected to the flexible circuit films, so as to transmit at least two different common voltages to a portion of the common electrode via the flexible circuit films.

14 Claims, 6 Drawing Sheets

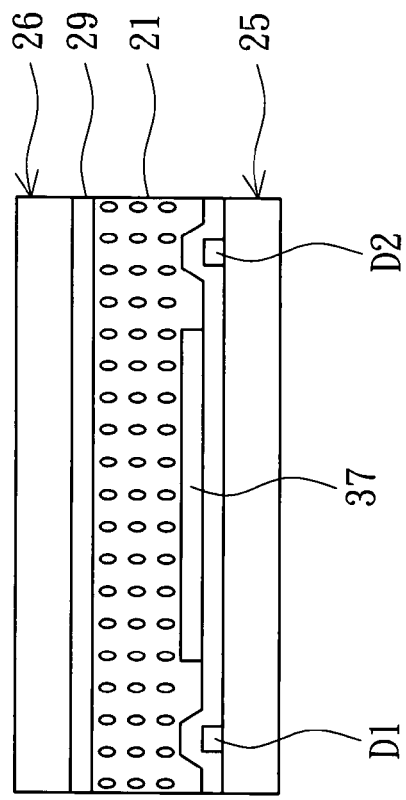
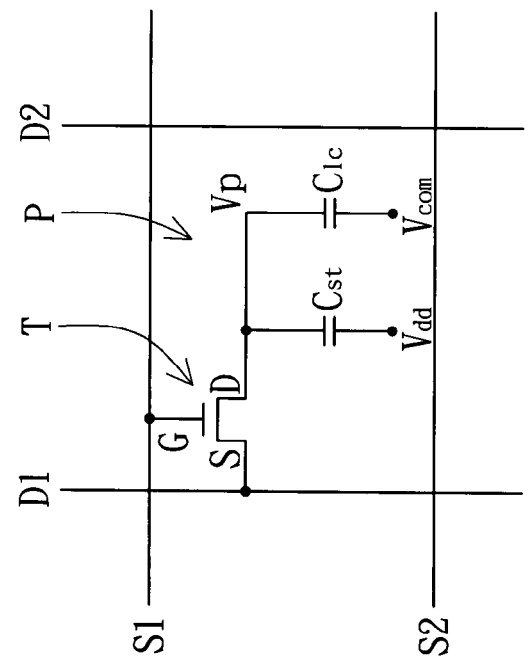
FIG. 3
FIG. 2

DISPLAY PANEL INCLUDING A CASCADE DRIVER AND OPTO-ELECTRONIC APPARATUS THEREOF

This application claims the benefits of Taiwan Application No. 96113706, filed Apr. 18, 2007, the contents of which are herein incorporated by reference in its entirety.

BACKGROUND OF THE INVENTION

1. Field of the Invention

The present invention relates to a display panel, and more particularly to a display panel cascade driver and capable of transmitting at least two different common voltages to a common electrode.

2. Description of the Related Art

With the advance in science and technology, display panel has become indispensable to modern people's everyday life. Examples of the application of display panel include TV, computer screen, personal digital assistant, and mobile phone. The popular application of display panel has brought great convenience and lots of fun in terms of entertainment and recreation.

The liquid crystal display panel includes a thin-film transistor substrate, a color filter substrate, a liquid crystal layer, a printed circuit board, and several flexible circuit films. The liquid crystal layer is disposed between the thin-film transistor substrate and the color filter substrate. The thin-film transistor substrate includes several pixels, each defined by any one scan line and any one data line interlaced with each other. The scan lines are corresponding electrically connected to several scan driving circuits, and the data lines are corresponding electrically connected to several data driving circuits, wherein the data driving circuits are electrically isolated from each other. Thus, the printed circuit board transmits a signal to a corresponding data driving circuit via every flexible circuit film. Generally, one flexible circuit film corresponds to one data driving circuit. The printed circuit board transmits a signal to a scan driving circuit via one flexible circuit film. Each pixel includes a thin-film transistor and a pixel electrode. The thin-film transistor has a gate, a drain and a source, wherein the gate, the drain and the source are electrically connected to a corresponding scan line, a pixel electrode and a data line, respectively. When the scan driving circuit provides a scan signal to turn on the gate of the pixel of each row sequentially, the data voltage transmitted via the data line will be inputted to the pixel electrode via the thin-film transistor whose pixel is turned on, so that the pixel electrode receives a pixel voltage.

The color filter substrate includes one color filter and one common electrode, wherein the color filter is covered by the common electrode. The peripheral of the common electrode is electrically connected to the circuit of the thin-film transistor substrate via silver pastes or gold ball. The printed circuit board transmits a set of fixed common voltage to the common electrode from the peripheral of the common electrode via the flexible circuit film, the circuit of thin-film transistor substrate and silver pastes or gold ball. The liquid crystal layer disposed between the common electrode and the pixel electrode can obtain a corresponding cross-voltage, that is, the voltage difference between the pixel voltage and the common voltage, from each pixel to rotate the liquid crystal molecules. Thus, when a light source is provided to the display panel, each pixel generates necessary change in luminance. Supposing the direction of the electric fields applied to the liquid crystal layer are the same, the arrangement of the liquid crystal molecules will deteriorate due to the long duration of the same rotating direction. To avoid the liquid crystal layer from generating the above rotation deterioration, a data voltage inverse driving method is provided. According to the data voltage inverse driving method, positive-polarity data voltage and negative-polarity data voltage are alternately provided to the same pixel as the pixel voltage of each pixel in different time intervals.

However, after the pixel electrode receives the pixel voltage, when the gate is turned off, a feed-through effect will occur due to the parasitic capacitance between the gate and the drain. As a result, when the gate is turned off, the pixel voltage will slightly drop off due to the feed-through effect. Therefore, the pixel voltage actually received by the pixel electrode is slightly less than the data voltage transmitted from the data line. Meanwhile, gate delay will occur due to the resistance of the scan line and the parasitic capacitance between the scan line and its neighboring conductor. That is, on the same scan line, the farther away from the scan driving circuit, the worse the gate delay will be. Thus, in the same row of pixels, the farther away from the scan driving circuit, the worse the distortion of the voltage wave of the pixel electrode will be due to the above gate delay. Furthermore, as the common electrode receives the common voltage by the edge of the common electrode, the resistance effect of the common electrode will cause the voltage at the central area of the common electrode to be less than the voltage at the edge area. Conventionally, the display panel only provides one common voltage to the common electrode. When the pixel is driven according to the data voltage inverse driving method, the above gate delay effect and the distortion of the voltage wave effect that the voltage at the central area of the common electrode being less than that at the edge area will cause the display panel to produce a image flicker phenomenon, and the larger the display panel is, the worse the image flickering will be. Conventionally, the display panel corresponds to one data driving circuit by one flexible circuit film, and this is very costly in the manufacturing process.

SUMMARY OF THE INVENTION

It is therefore the present invention to provide a display panel. The design of transmitting at least two different common voltages to a common electrode reduces the image flickering of the display panel, and effectively improving the display quality of the display panel.

The present invention provides a display panel. The display including a liquid crystal layer, several driving circuits, several flexible circuit films, and at least one printed circuit board. The liquid crystal layer is disposed between a first substrate and a second substrate, wherein the first substrate has a display area and at least one peripheral area adjacent to the display area, the second substrate has at least one common electrode. The driving circuits are disposed on the peripheral area in series. The flexible circuit films are electrically connected to the driving circuits. The printed circuit board, electrically connected to the flexible circuit films, transmits at least two different common voltages to a portion of the common electrode via the flexible circuit films.

The present invention will become apparent from the following detailed description of the preferred but non-limiting embodiments. The following description is made with reference to the accompanying drawings.

BRIEF DESCRIPTION OF THE DRAWINGS

FIG. 2 is an equivalent circuit diagram of a single pixel in a display area of FIG. 1;

FIG. 3 is a horizontal cross-sectional view of a single pixel of FIG. 2;

DETAILED DESCRIPTION OF THE INVENTION

Figure 1:
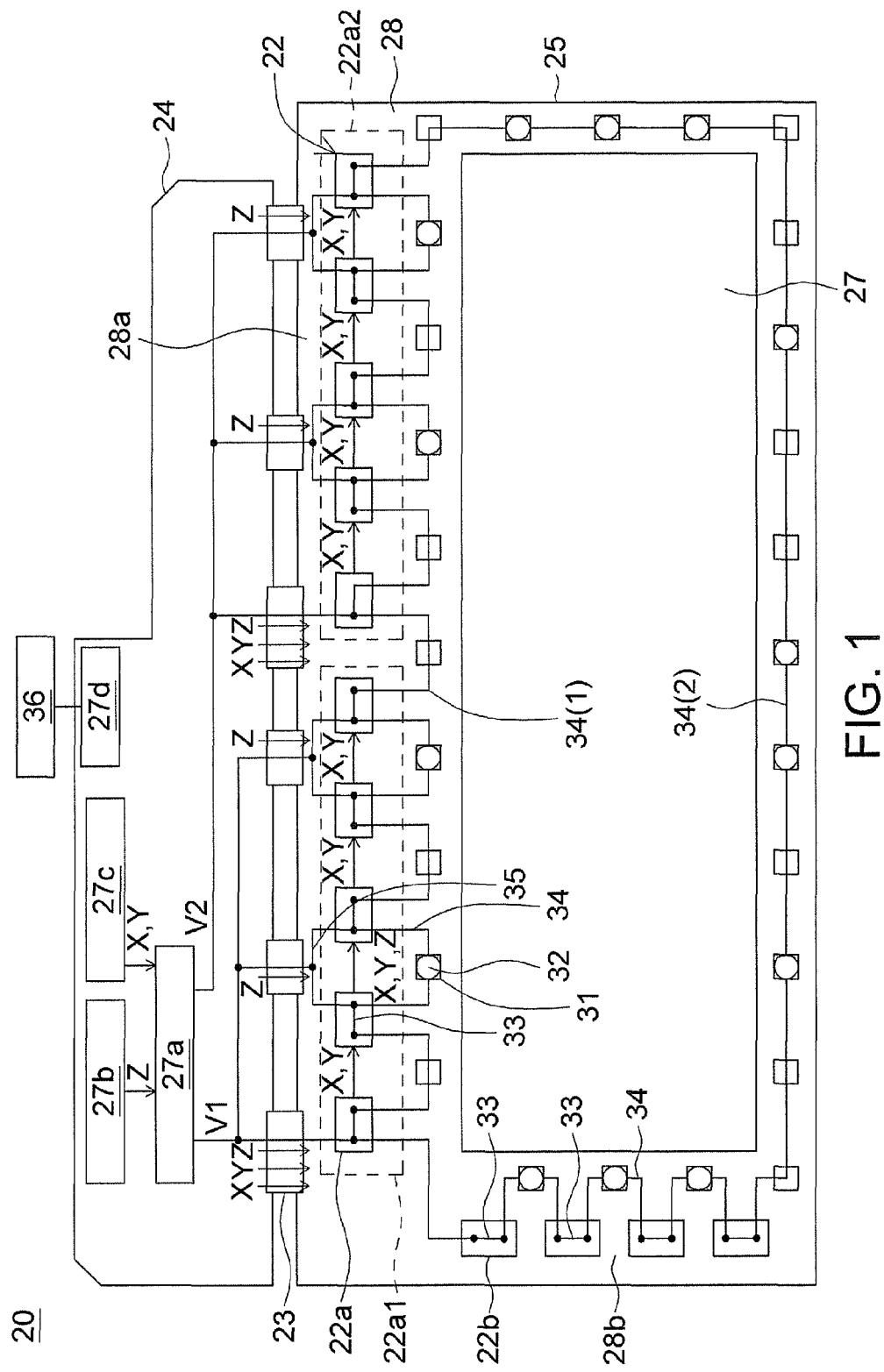
FIG. 1 is a perspective of a display panel according to one embodiment of the present invention.

Referring to FIGS. 1~3. FIG. 1 is a perspective of a display panel according to one embodiment of the present invention. FIG. 2 is an equivalent circuit diagram of a single pixel in a display area of FIG. 1. FIG. 3 is a horizontal cross-sectional view of a single pixel of FIG. 2. As indicated in FIGS. 1~3, the display panel 20 includes a liquid crystal layer 21, several driving circuits 22, several flexible circuit films 23, and at least one printed circuit board 24. The liquid crystal layer 21 is disposed between a first substrate 25 and a second substrate 26. The first substrate 25 has a display area 27 and at least one peripheral area 28, wherein the peripheral area 28 is adjacent to the display area 27. The second substrate 26 has at least one common electrode 29. The driving circuits 22 are disposed on the peripheral area 28 in series. The flexible circuit films 23 are electrically connected to the driving circuits 22 and disposed between the first substrate 25 and the printed circuit board 24. The printed circuit board 24 electrically connected to the flexible circuit films 23 transmits at least two different common voltages V1 and V2 to a portion of the common electrode 29 respectively via the flexible circuit films 23, so that the common electrode 29 has different distributions of common voltage in the display area 27. Thus, the image flickering of the display panel 20 is reduced and the display quality of the display panel 20 is effectively improved.

In the present embodiment of the invention, as indicated in FIG. 1, the display panel 20 further includes several contact pads 31 disposed on the peripheral area 28, wherein a portion of the contact pads 31 is near to the position between each two of the adjacent the driving circuits 22. For example, a portion of the contact pads 31 is near to the position between two of the adjacent the driving circuits 22. Besides, the display panel 20 further includes at least one transfer 32 disposed on a portion of the contact pads 31 to be electrically connected to the common electrode 29. The transfer 32 is made from a conductive material, such as silver pastes, a polymer sphere coated with a conductive material, or other materials, or a combination thereof. Examples of the conductive material includes gold, silver, copper, iron, lead, molybdenum, niobium, titanium, tantalum, aluminum, tungsten, hafnium, indium tin oxide, indium zinc oxide, aluminum zinc oxide, zinc oxide, or an alloy thereof, or other materials, or a combination thereof. Furthermore, each driving circuit 22 has at least one internal connected circuit 33. For example, the internal connected circuit 33 passes through each driving circuit 22 via a by-passes manner, but in not limited thereto. Moreover, the display panel 20 further includes at least one external connected circuit 34 disposed between any two driving circuits 22 and electrically connected to the internal connected circuit 33 and each contact pad 31. Moreover, the display panel 20 further includes at least one external connected circuit 35 (or namely another external connected circuit 35) disposed corresponding the contact pad 31 having a transfer 32 disposed thereon, wherein the external connected circuit 35 is electrically connected to one of the corresponding internal connected circuit 34 and the flexible circuit films 23.

The several driving circuits 22 include several data driving circuits 22a and scan driving circuits 22b. The data driving circuits 22a are divided into several sets of data driving circuits, such as two or more than two sets of data driving circuits. The present embodiment of the invention is exemplified by two sets of data driving circuits, but in not limited thereto. In FIG. 1, the left five data driving circuits 22a form the first set of data driving circuits 22a1, and the right five data driving circuits 22a form the second set of driving circuits 22a2, wherein one of the flexible circuit films 23 corresponding to each set of data driving circuits can transmit a data signal X and a gamma signal Y to each set of data driving circuits from the printed circuit board 24. That is, one of the flexible circuit films 23 corresponding to the first set of data driving circuits 22a1 can transmit a data signal X and a gamma signal Y to the first set of data driving circuits 22a1 from the printed circuit board 24; one of the flexible circuit films 23 corresponding to the second set of data driving circuits 22a2 can transmit a data signal X and a gamma signal Y to the second set of data driving circuits 22a2 from the printed circuit board 24. In FIG. 1, the first flexible circuit film 23 counted from the left can transmit a data signal X and a gamma signal Y from the printed circuit board 24 to the leftmost data driving circuit 22a of the first set of data driving circuits 22a1 first, and then transmit the data signal X and the gamma signal Y to the remaining data driving circuits 22a of the first set of data driving circuits 22a1 next. Moreover, the fourth flexible circuit film 23 counted from the left can be transmits a data signal X and a gamma signal Y from the printed circuit board 24 to the leftmost data driving circuit 22a of the second set of data driving circuits 22a2 first, and then transmit the data signal X and the gamma signal Y to the remaining data driving circuits 22a of the second set of data driving circuits 22a2 next. The flexible circuit films 23 can correspondingly transmit a power signal Z to every data driving circuit 22a of the first set of driving circuits 22a1 and the second set of driving circuits 22a2 from the printed circuit board 24. The internal connected circuit 33 is used as a by-pass line for the scan driving circuit 22b, but in not limited thereto.

The above different common voltages V1 and V2 are provided by a common voltage generator 27a, but are not limited thereto. The number of common voltage generators is determined according to the number of different common voltages to be provided. The common voltage generator 27a is disposed on the printed circuit board 27 or on the circuit formed by the elements disposed on the first substrate 25, or a combination thereof.

The circuits used for transmitting different common voltages can be electrically connected or isolated. For example, the circuits used for transmitting the two common voltages V1 and V2 are electrically connected in the presence of the external connected circuit 34 (1) and the connected circuit 34 (2) and are electrically isolated in the absence of the external connected circuit 34 (1) and the connected circuit 34 (2).

Moreover, the printed circuit board 24 at least includes at least one power circuit 27b, at least one integrated circuit element 27c, at least one connecting port 27d, or other elements, or a combination thereof. The power circuit 27b receives an external power and according to the external power outputs a power signal Z required by the display panel 20. The integrated circuit element 27c receives the external signal and according to the external signal outputs at least one of the gamma signal Y and the data signal X, wherein examples of the integrated circuit element 27c include timing controller, memory, application specific integrated circuit (ASIC), and so on. The connecting port 27d is used for electrically connecting an external system 36 such as computer, display card, signal processor, and so on. It is noted that a portion of signals of the above flexible circuit film basically comes from the integrated circuit element 27c disposed on the printed circuit board 24, and the other signals are transmitted to the display panel 20 via the connecting port 27d. The common voltage generator 27a disclosed above can be integrated with the power circuit 27b.

The display area 27 includes several scan lines (not illustrated in FIG. 1) and several data lines (not illustrated in FIG. 1), wherein the scan lines are electrically connected to the scan driving circuits 22b, the data lines are electrically connected to the data driving circuits 22a. Several pixels (not illustrated in FIG. 1) are defined by the scan lines and the data lines substantially interlaced with each other. In the present embodiment of the invention, as indicated in FIG. 2, the scan lines S1 and S2 substantially interlaced with the data lines D1 and D2, a pixel P is defined by the scan line S1 and the data line D1. The pixel P includes a thin-film transistor T and a pixel electrode 37, wherein the thin-film transistor T includes a gate G, a drain D and a source S, and the gate G, the drain D and the source S are electrically connected to the scan line S1, the pixel electrode 37 and the data line D1, respectively. The pixel P further includes a storage capacitor Cst and a liquid crystal capacitor Clc, wherein the storage capacitor Cst is electrically connected to the pixel electrode 37 and a voltage line, and the cross-voltage of the storage capacitor Cst is provided by a pixel voltage Vp and a voltage (such as Vdd or other voltages). If the above voltage line is electrically connected to the contact pad 31, then the voltage Vdd is a common voltage Vcom, and the storage capacitor Cst is a Cs on common. If the above voltage line is electrically connected to a scan line S2, then the voltage Vdd is the voltage of the scan line S2, and the storage capacitor Cst is a Cs on gate. Thus, the voltage transmitted by the above voltage lines can be constant or adjustable. The liquid crystal capacitor Clc is formed by containing the liquid crystal layer 21 by the common electrode 29 and the pixel electrode 37 from atop and underneath, respectively. The cross-voltage of the liquid crystal capacitor Clc is provided by the pixel voltage Vp and the common voltage Vcom. Besides, the thin-film transistor T can be a bottom-gate thin-film transistor (BCE, I-stop, or likes), a top-gate thin-film transistor, or a transistor of other types. The thin-film transistor further includes a channel layer disposed among the gate G, the source S and the drain D. The channel layer is made from an amorphous silicon-containing material, poly-crystal silicon-containing material, single-crystal silicon-containing material, micro-crystal silicon-containing material, or a combination thereof.

Figure 4A:
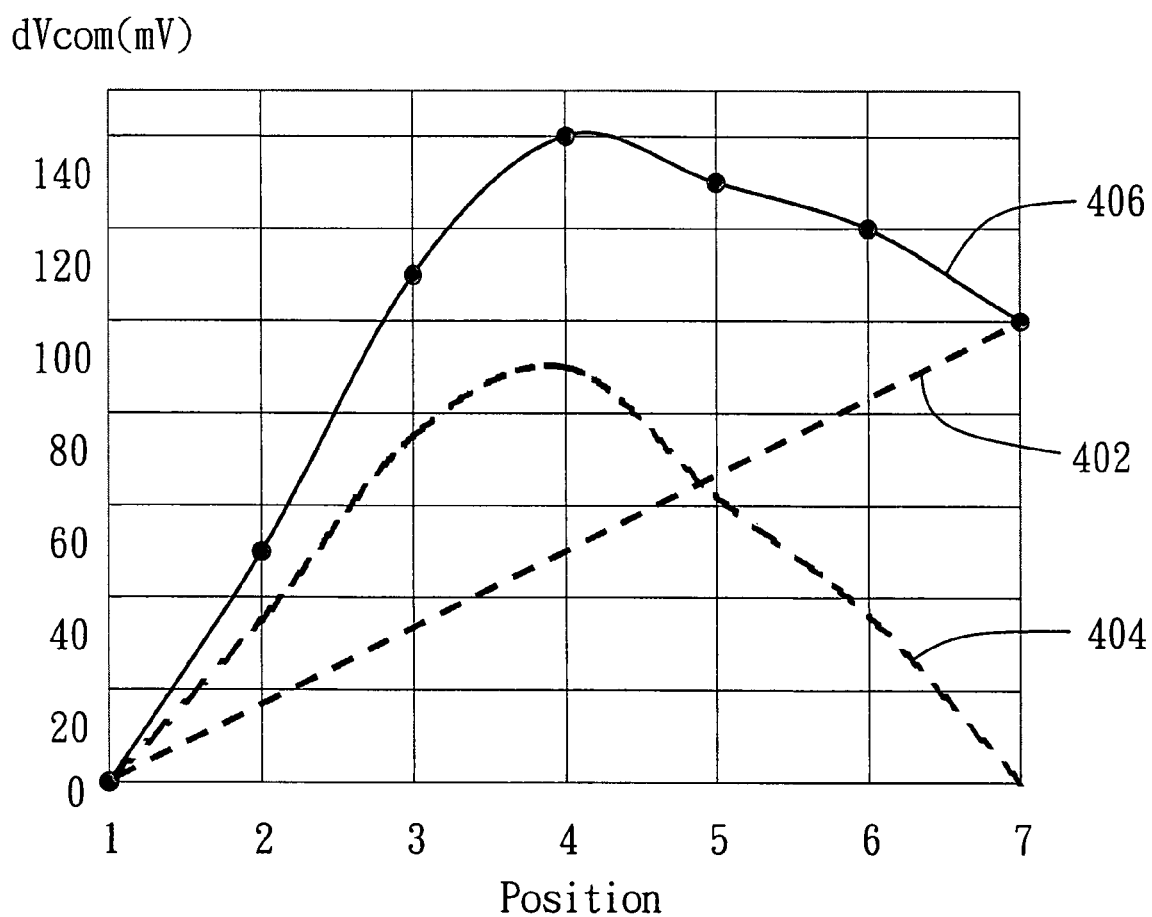
FIG. 4A is a distribution diagram of optimum common electrodes for different positions obtained from experiments.
Figure 4B:
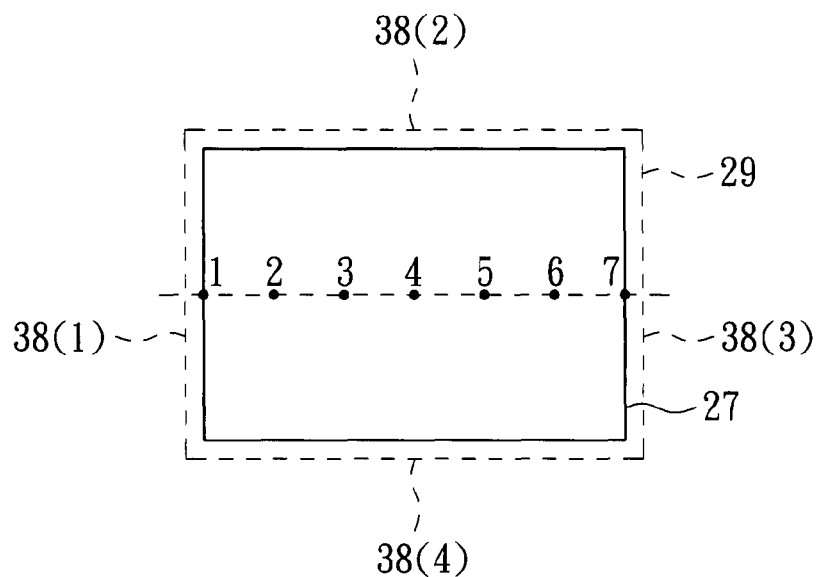
FIG. 4B illustrates the corresponding positions of positions 1~7 of FIG. 4A in the display area 27.

Referring to FIG. 4A, a distribution diagram of optimum common electrodes for different positions obtained from experiments is shown. FIG. 4B illustrates the corresponding positions of positions 1~7 of FIG. 4A in the display area 27. The experiment is conducted as below. Firstly, a common voltage is inputted from the four edges 38 (1)~38 (4) of the common electrode 29. During the experiment, the volume of the optimum common voltage Vcom' inputted is changed, and the voltage difference dVcom between the original voltage Vcom0 of the common voltage and the optimum common voltage Vcom' minimizing the image flickering at position 1 to position 7 of the display area 27 respectively is recorded. The original voltage Vcom0 of the common voltage is determined by a rule that the positive pixel voltages and negative pixel voltages are symmetric to the original common voltage as much as possible, so that the image flickering at position 1 is minimized.

Figure 5A:
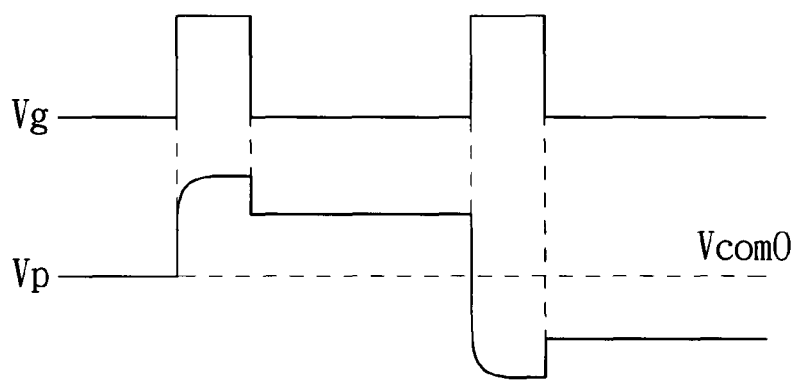
FIG. 5A is a wave diagram of gate voltage Vg and pixel voltage Vp under ideal state.
Figure 5B:
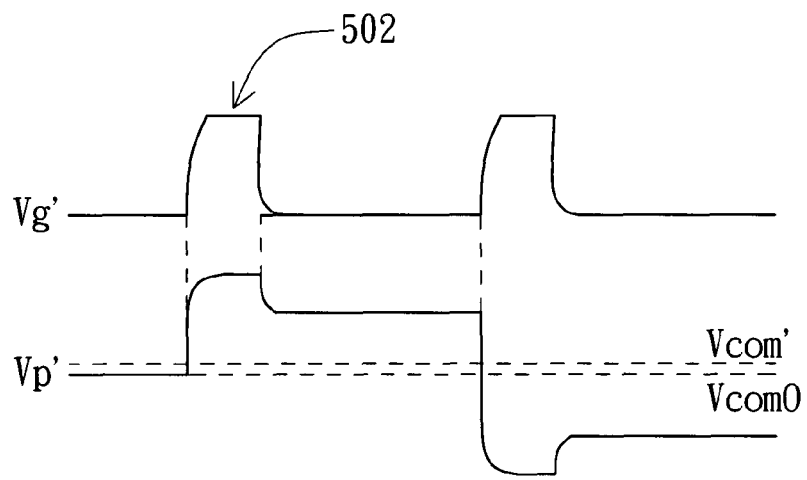
FIG. 5B is a wave diagram of gate voltage Vg' and pixel voltage Vp' with gate delay.

In FIG. 4A, the curve 402 is a distribution curve of the optimum common voltage obtained when gate delay is compensated. Referring to both FIG. 5A and FIG. 5B. FIG. 5A is a wave diagram of gate voltage Vg and pixel voltage Vp under ideal state. FIG. 5B is a wave diagram of gate voltage Vg' and pixel voltage Vp' with gate delay. As indicated in FIG. 5B, when gate delay occurs, the pulse 502 received by the gate G is distorted, so the wave pattern of the pixel voltage Vp' is distorted as well. By using a higher common voltage Vcom', the wave distortion of the pixel voltage Vp' is compensated and image flicker is reduced. According to the curve 402, the optimum common voltage of a position farther away from the gate driver 22b is substantially greater than the optimum common voltage of a position near to the gate driver 22b.

In FIG. 4A, the curve 404 is a distribution curve of the optimum common voltage obtained when common electrode delay, which occurs when the voltage at the central area of the common electrode is less than the voltage at the edge area of the common electrode, is compensated. As the common electrode receives the common voltage by the edge of the common electrode, the resistance effect of the common electrode will cause the voltage at the central area of the common electrode to be less than the voltage at the edge area. Thus, in order to compensate the voltage at the central area of the common electrode which is less than the voltage at the edge area of the common electrode, the volume of the common voltage must be increased so as to reduce the flickering of image at the central area of the common electrode. Thus, the compensation of the common voltage corresponding to the central area (such as position 4) of the display area 27 is substantially greater than the compensation of the common voltage corresponding to the edge area (such as position 1 or 7) of the display area 27. Thus, as the experiment is conducted along with the change in the inputted volume of the optimum common voltage Vcom', the volume of the optimum common voltage Vcom' minimizing image flicker at position 4 of the display area 27 is substantially greater than the volume of the optimum common voltage Vcom' minimizing image flicker at position 1 or 7 of the display area 27. According to the curve 404, the optimum common voltage near to the central area (such as position 4) of the display area is indeed greater than the optimum common voltage near to the edge area (such as position 1 and position 7).

The curve 406 is obtained by adding up the curve 402 and the curve 404. According to the curve 406, the optimum common voltage Vcom' at position 4 is the maximum, and the average optimum common voltage Vcom' at position 1 to position 3 is less than the average optimum common voltage Vcom' of position 5 to position 7.

As for how two or more than two sets of common voltages are selected and provided to the common electrode 29 in the present embodiment of the invention is stated below. Basically, one of the common voltages received by a first portion of the common electrode 29 near to the driving circuits 22 is substantially less than another one of common voltages received by a second portion of the common electrode 29 farther away from the driving circuits 22. For example, the common voltage V1 received at a first portion of the common electrode 29 near to the scan driving circuits 22a is substantially less than the common voltage V2 received at a second portion of the common electrode 29 farther away from the scan driving circuits.

Figure 6:
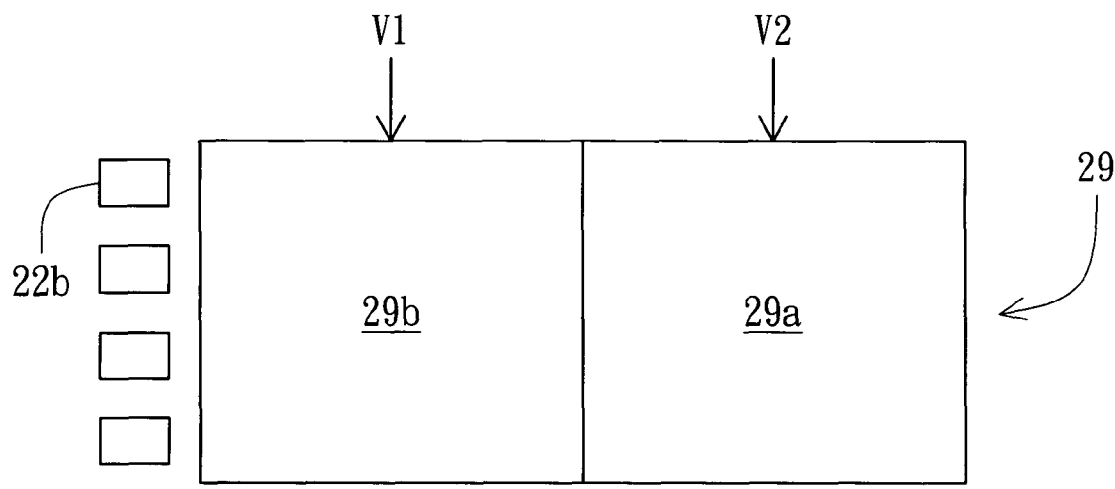
FIG. 6 is a perspective showing the common electrode has two common voltage areas according to the embodiment of the present invention.

Referring to FIG. 6, a perspective showing the common electrode has two common voltage areas according to the embodiment of the present invention is shown. The common electrode 29 has a high common voltage area 29a (or namely first common voltage area) and a low common voltage area 29b (or namely second common voltage area), wherein the high common voltage area 29a is farther away from the gate driver 22b than the low common voltage area 29b. The low common voltage area 29b and the high common voltage area 29a respectively receive two different common voltages, such as the common voltage V1 and V2 of FIG. 1. According to FIG. 4A, V2 is substantially greater than V1, and preferably by about 100 mV.

Figure 7:
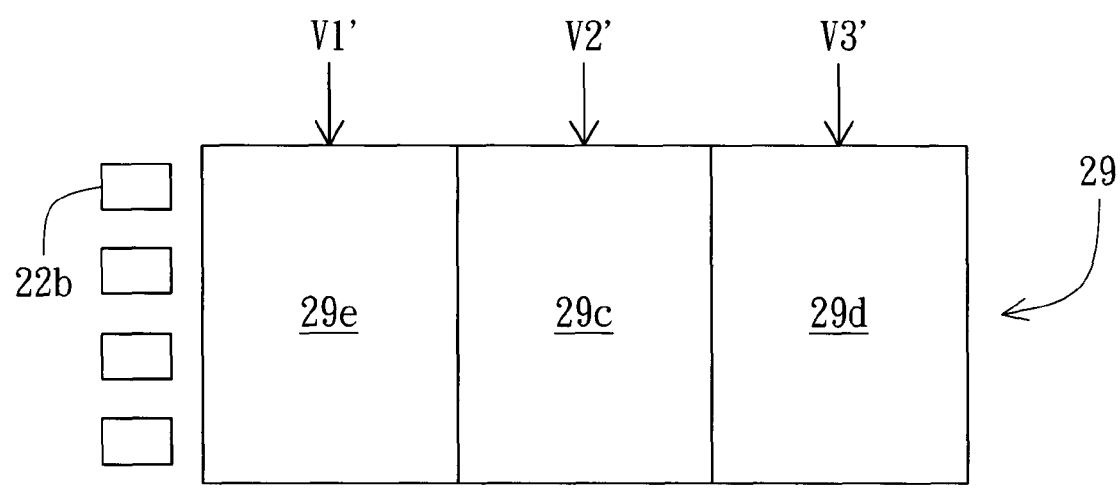
FIG. 7 is a perspective showing the common electrode has three common voltage areas according to the embodiment of the present invention.

Referring to FIG. 7, a perspective showing the common electrode has three common voltage areas according to the embodiment of the present invention is shown. The common electrode 29 is divided into a first high common voltage area 29c (or namely first common voltage area), a second high common voltage area 29d (or namely middle common voltage area, or second common voltage area), and a low common voltage area 29e (or namely third common voltage area), wherein the low common voltage area 29e, the first high common voltage area 29c, and the second high common voltage area 29d are sequentially farther away from the gate driver 22b. The low common voltage area 29e, the first high common voltage area 29c, and the second high common voltage area 29d receive three different common voltages V1', V2' and V3', respectively. According to FIG. 4A, V2' is substantially greater than V3', and V3' is substantially greater than V1'.

Figure 8:
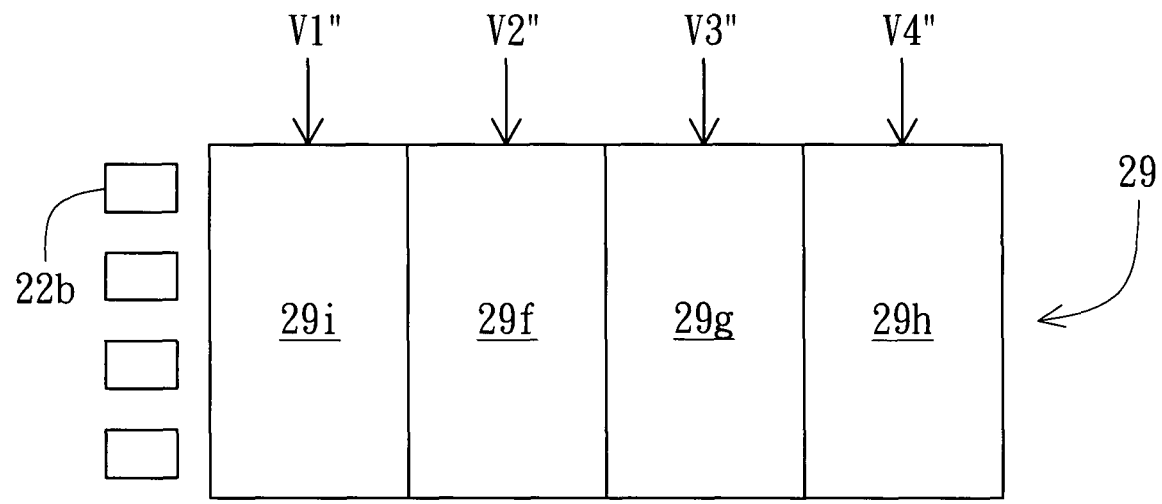
FIG. 8 is a perspective showing the common electrode has four common voltage areas according to the embodiment of the present invention.

Referring to FIG. 8, a perspective showing the common electrode has four common voltage areas according to the embodiment of the present invention is shown. The common electrode 29 is divide into a first high common voltage area 29f (or namely first common voltage area), a second high common voltage area 29g (or namely second common voltage area), a second low common voltage area 29h (or namely fourth common voltage area), and a first low common voltage area 29i (or namely third common voltage area), wherein the first low common voltage area 29i, the first high common voltage area 29f, the second high common voltage area 29g, and the second low common voltage area 29h are sequentially farther away from the gate driver 22b. The first low common voltage area 29i, the first high common voltage area 29f, the second high common voltage area 29g, and the second low common voltage area 29h receive four different common voltages V1", V2", V3" and V4", respectively. According to FIG. 4A, V2" is substantially greater than V3", V3" is substantially greater than V4", and V4" is substantially greater than V1".

In FIGS. 6~8, the gate driver 22b is illustrated in a simplified manner. However, the electrical connection of each of the gate driver 22b is the same as that in FIG. 3, that is, every two gate drivers 22b are electrically connected via an internal connected circuit 33 and an external connected circuit 34.

The above-mentioned data driving circuits 22a can be a cascade source driving circuit (CSD), for example, the type of cascade source driving circuit (CSD) is the chip on glass (COG) source driver chip transmitting the signal and electrically connected in series by incorporating the wires on array (WOA) design, or the data driving circuits 22a are incorporated with the elements required for making the display area 27, or other methods, or a combination thereof for transmitting a signal required for the display panel 20 to display an image. Examples of the required signal include power signal, gamma signal, clock signal, control signal, and so on. Compared with the data driving circuit of a conventional display panel, the design of the cascade source driver incorporated in the present embodiment of the invention reduces the size and layer number of the printed circuit boards, hence further reducing the size and number of the flexible circuit film and lowering the manufacturing costs as well.

The design of the scan driving circuit 22b can be achieved by disposing the scan driving chip on the peripheral area 28 according to the chip on glass (COG) technology, electrically connecting the tape carrier package (TCP) to the scan line according to the tape automated bonding (TAB) technology, or forming the scan driving circuit 22b with the elements required for making the display area 27, or other methods, or a combination thereof. Meanwhile, if the scan driving chip is packaged on the flexible circuit film, the present embodiment of the invention needs the original printed circuit board or another printed circuit board electrically connected to the above tape carrier package (TCP), wherein the printed circuit board electrically connected to the scan driving circuit can be electrically connected to the above printed circuit board 24 for receiving the signal required by the scan driving circuit.

Figure 9:
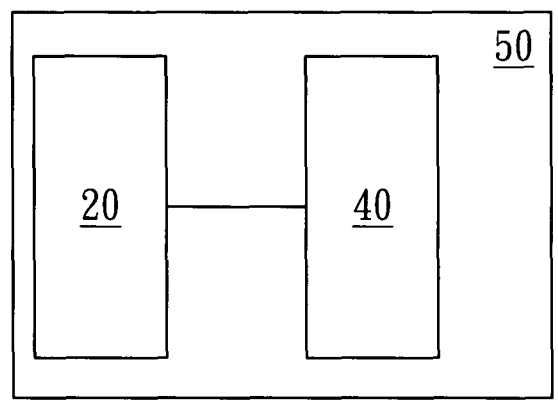
FIG. 9 is a block diagram of an electro-optical apparatus formed by a display panel and an electronic element.

Moreover, as indicated in FIG. 9, the display panel 20 disclosed in the above-mentioned embodiment of the present invention can form an electro-optical apparatus 50 with an electronic element 40. Examples of the electronic element 40 includes controlling element, operating element, processing element, inputting element, memory element, driving element, illuminating element, protecting element, sensing element, detecting element, or elements of other functions, or a combination thereof. Examples of the electro-optical apparatus 50 include portable electronic products (such as a mobile phone, a camcorder, a camera, a laptop, a video game player, a watch, a music player, an email receiver/sender, a navigator, a digital frame, or a similar product), a video/audio product (such as a video/audio player or a similar product), a screen, a television, an outdoor/indoor billboard, or a panel of a projector, and so on. Besides, the variety of the display panel 20 is determined according to the material of the layer contacted by at least one of the pixel electrode and the drain such as liquid crystal layer, organic electroluminescent layer (such as micro-molecule, high polymer, or a combination thereof), or a combination thereof. Furthermore, if the display panel 20 is a liquid crystal display panel, then the display panel 20 can be exemplified by transmissive panel, transflective panel, reflective panel, dual-display panel, vertical alignment (VA) panel, in-plane switching (IPS) panel, multi-domain vertical alignment (MVA) panel, twisted nematic (TN) panel, super twisted nematic (STN) panel, patterned vertical alignment (PVA) panel, super patterned vertical alignment (S-PVA) panel, advanced super view (ASV) panel, fringe-field switching (FFS) panel, continuous pinwheel alignment (CPA) panel, ax symmetric micelle (ASM) panel, optical compensation bend (OCB) panel, super in-plane switching (S-IPS) panel, advanced super in-plane switching (AS-IPS) panel, ultra fringe-field switching panel (UFFS), polymer stabilization alignment (PSA), dual-view panel, triple-view panel, or panels, or a combination thereof.

According to the display panel disclosed in the above embodiment of the invention, the design of transmitting at least two different common voltages to a common electrode reduces the image flicker of the display panel, effectively improving the display quality of the display panel. When the pixel is driven according to the data voltage inverse driving method, the image will flicker if the display panel has gate delay and/or common electrode delay which occur if the voltage at the central area of the common electrode is less than the voltage at the edge area of the common electrode. Besides, the cascade source driver design used in the present embodiment of the invention reduces the size and layers of the printed circuit board, hence reducing the size and number of the flexible circuit film and lowering down the cost as well.

It will be apparent to those skilled in the art that various modifications and variations can be made to the structure of the present invention without departing from the scope or spirit of the present invention. In view of the foregoing, it is intended that the present invention cover modifications and variations of this invention provided they fall within the scope of the following claims and their equivalents.

What is claimed is:

1. A display panel, comprising:
a liquid crystal layer disposed between a first substrate and a second substrate, wherein the first substrate has a display area and at least one peripheral area adjacent to the display area, the second substrate has at least one common electrode;
a plurality of driving circuits disposed on the peripheral area in series;
a plurality of flexible circuit films electrically connected to the driving circuits; and
at least one printed circuit board electrically connected to the flexible circuit films, so as to transmit at least two different common voltages to a portion of the common electrode via the flexible circuit films, wherein a level of one of the at least two different common voltages is independent of a level of another;
wherein the driving circuits are divided into plural sets of driving circuits and the flexible circuit films are divided into plural sets of flexible circuit films, wherein one of the flexible circuit films in the each set corresponding to each set of the driving circuits transmits a data signal, a gamma signal, and a power signal to a first driving circuit of each set of the driving circuits and then transmits the data signal and the gamma signal to the adjacent driving circuits of each set of the driving circuits, and another one of the flexible circuit films in the each set corresponding to each set of the driving circuits transmits only a power signal to a second driving circuit of each set of the driving circuits.

2. The panel according to claim 1, wherein each driving circuit has at least one internal connected circuit.

3. The panel according to claim 2, further comprising a plurality of contact pads disposed on the peripheral area.

4. The panel according to claim 3, wherein a portion of the contact pads are disposed between each two of the adjacent the driving circuits.

5. The panel according to claim 3, further comprising at least one external connected circuit disposed between any of the driving circuits and electrically connected to the internal connected circuit and each contact pad.

6. The panel according to claim 3, further comprising at least one transfer disposed on a portion of the contact pads, so as to electrically connect to the common electrode.

7. The panel according to claim 6, further comprising at least one external connected circuit disposed corresponding any contact pads having a transfer disposed thereon, wherein the at least one external connected circuit is electrically connected to one of the internal connected circuit and the flexible circuit films.

8. The panel according to claim 2, wherein each driving circuit comprises a scan driving circuit, and the internal connected circuit is adapted to a by-pass line.

9. The panel according to claim 1, wherein each driving circuit comprises a data driving circuit.

10. The panel according to claim 1, wherein the flexible circuit films transmits a power signal.

11. The panel according to claim 1, wherein one of the common voltages received by a first portion of the common electrode near to the driving circuits is substantially less than another one of the common voltages received by a second portion of the common electrode farther away from the driving circuits.

12. An electro-optical apparatus incorporating the display panel of claim 1.

13. The panel according to claim 1, wherein another one of the flexible circuit films in the each set corresponding to each set of the driving circuits transmits a power signal to a second driving circuit of each set of the driving circuits.

14. The panel according to claim 1, wherein the one of the flexible circuit films in the each set corresponding to the each set of the driving circuits transmits additional power signal.

* * * * *